(12) United States Patent
Brunner et al.

(10) Patent No.: US 11,674,641 B2
(45) Date of Patent: Jun. 13, 2023

(54) SAFETY SYSTEM

(71) Applicant: SICK AG, Waldkirch (DE)

(72) Inventors: Fabio Brunner, Waldkirch (DE); Markus Hammes, Waldkirch (DE); Mathias Ams, Waldkirch (DE)

(73) Assignee: SICK AG, Waldkirch (DE)

( * ) Notice: Subject to any disclaimer, the term of this patent is extended or adjusted under 35 U.S.C. 154(b) by 56 days.

(21) Appl. No.: 17/314,608

(22) Filed: May 7, 2021

(65) Prior Publication Data

US 2021/0348718 A1 Nov. 11, 2021

(30) Foreign Application Priority Data

May 11, 2020 (DE) .......................... 102020112699.9

(51) Int. Cl.
*F16P 3/14* (2006.01)
(52) U.S. Cl.
CPC ............... *F16P 3/147* (2013.01); *F16P 3/142* (2013.01)
(58) Field of Classification Search
CPC .................................. F16P 3/147; F16P 3/142
See application file for complete search history.

(56) References Cited

U.S. PATENT DOCUMENTS

| | | | |
|---|---|---|---|
| 7,170,406 B2 | 1/2007 | Seemann | |
| 2003/0197612 A1* | 10/2003 | Tanaka | G08B 13/2462 340/8.1 |
| 2007/0152833 A1* | 7/2007 | Kaplan | G06K 19/0702 340/572.8 |
| 2011/0264266 A1* | 10/2011 | Kock | B25J 9/1676 700/255 |
| 2011/0273723 A1* | 11/2011 | Haberer | F16P 3/14 348/46 |

FOREIGN PATENT DOCUMENTS

| | | |
|---|---|---|
| DE | 10245720 A1 | 4/2004 |
| DE | 10347894 A1 | 5/2005 |
| DE | 102006042547 A1 | 3/2008 |
| DE | 102014101513 A1 | 8/2015 |
| DE | 102016203077 A1 | 8/2017 |
| EP | 2282106 A1 * | 2/2011 ............ B25J 9/1676 |
| EP | 2282106 A1 | 2/2011 |

OTHER PUBLICATIONS

Office Action dated Apr. 21, 2021 issued in corresponding German Application No. 10 2020 112 699.9.

* cited by examiner

*Primary Examiner* — Kam Wan Ma
(74) *Attorney, Agent, or Firm* — Nath, Goldberg & Meyer; Jerald L. Meyer; Tanya E. Harkins

(57) ABSTRACT

A safety system and a method having a safety system for localizing and identifying a person or an object, a control and evaluation unit, at least one radio location system, and having at least one identification sensor for identifying the person or the object, wherein a marking is arranged on the person or on the object, wherein the radio location system has arranged radio stations, wherein at least one radio transponder is arranged on the person or on the object, wherein position data of the person or of the object can be determined by means of the radio location system, and wherein the position data can be transmitted from the radio station of the radio location system to the control and evaluation unit, and identification data from the marking on the person or the object can be determined by means of the identification sensor.

14 Claims, 5 Drawing Sheets

SAFETY SYSTEM

Figure 1:
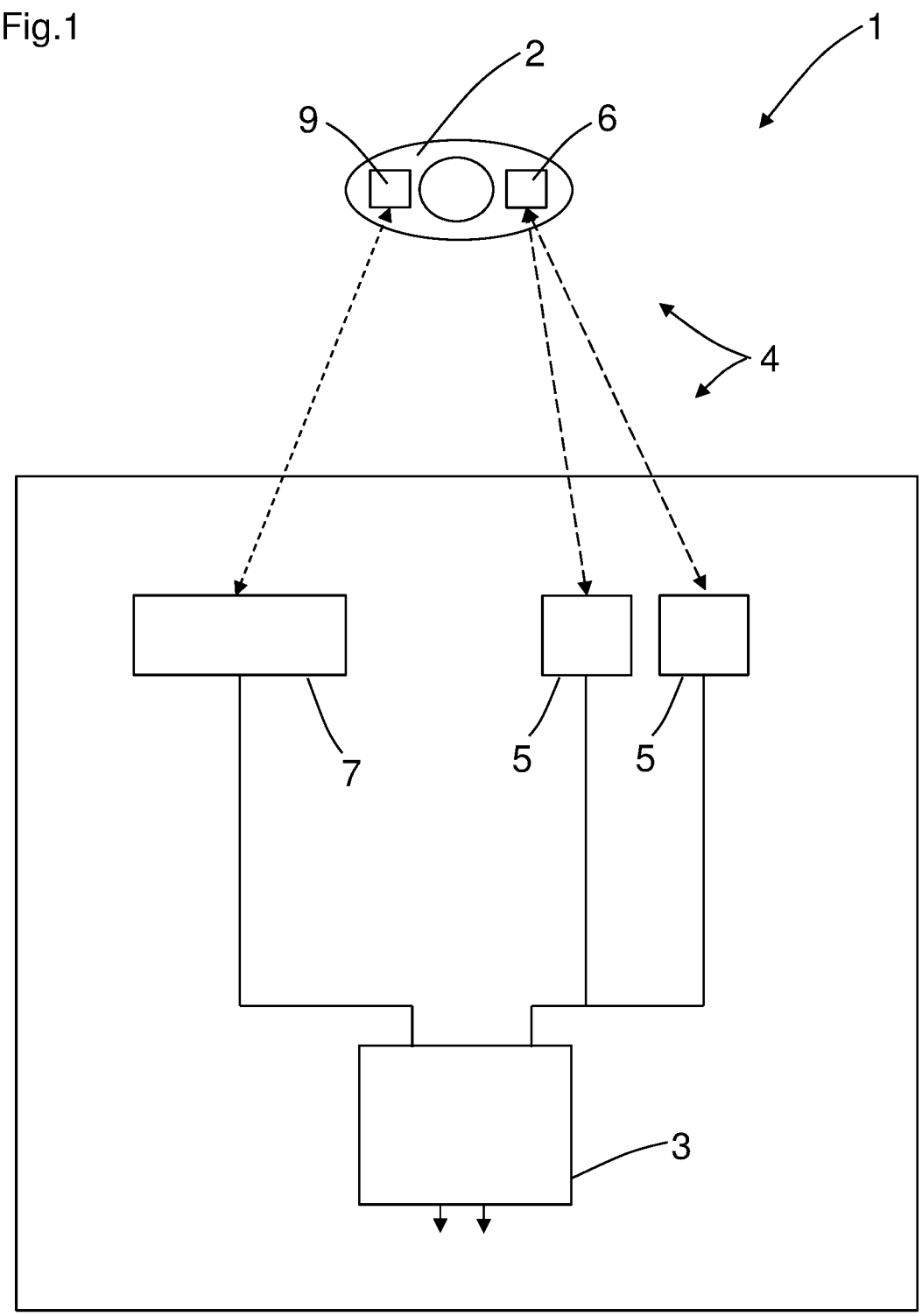

The present invention relates to a safety system for localizing and identifying a person or an object and to a method having a safety of localizing and identifying a person or an object.

The sensor system of functional safety has currently reached a level that basic physical features of the environment, for example geometrical information such as distances, lengths, or the presence of objects per se can be reliably detected and can be used in simple safety functions. In contrast, higher value information or derived meanings, for example the information of what type of object it is, are as a rule not reliably detectable by sensors and are therefore also not usable from a safety engineering aspect.

In this sense, in particular the information whether it is an object or a person or not is interesting for higher value safety functions. This safe object identification has previously not been able to be implemented, but is very important with respect to the situation-relevant control of the machine. An object classification is generally already a very complex process since as rule image data have to be used for this purpose that then have to be processed in a very laborious manner. This as a rule produces expensive sensors frequently having substantial latency Optoelectronic safety sensors, for example laser scanners or light grids, very reliably detect the presence of an object or of a person. Such safety sensors are in widespread use in the safeguarding of hazardous areas of machines and enable the implementation of very simple safety functions.

Machine movements are as a rule stopped or slowed on a detection of an object relevant to safety. What object it is remains out of consideration in this process. This information is generally also not available at all or is not usable for safety engineering purposes.

A simple detection function of existing safety sensors permits a reliable safeguarding of hazardous areas, but as a rule, has negative effects on the productivity of a machine. Independently of a class of the detected object, for example of a person, an article, or a disturbance or disturbing articles, it is necessary to switch off for safety relevant reasons even if this response would not be necessary in certain cases.

In particular secured knowledge that a detected object is a person or not would enable a very much more specific monitoring of a potentially hazardous machine.

An object of the invention comprises enabling a functionally safe recognition of persons or objects.

The object is satisfied by a safety system for localizing and identifying a person or an object having a control and evaluation unit, having at least one radio location system, and having at least one identification sensor for identifying the person or object, wherein a marking is arranged on the person or on the object, wherein the radio location system has arranged radio stations, wherein at least one radio transponder is arranged on the person or object, wherein position data of the person or object can be determined by means of the radio location system, and wherein the position data can be transmitted from the radio stations of the radio location system to the control and evaluation unit and identification data from the marking on the person or the object can be determined by means of the identification sensor, wherein the identification data can be transmitted from the identification sensor to the control and evaluation unit, and wherein the control and evaluation unit is configured to compare the position data of the radio location system and the identification data of the identification sensor and to form checked person data or checked object data on a valid agreement.

The object is furthermore satisfied by a method having a safety system for localizing and identifying a person or an object, having a control and evaluation unit, having at least one radio location system, having at least one identification sensor for identifying the person or the object, wherein a marking is arranged on the person or on the object, wherein the radio location system has arranged radio stations, wherein at least one radio transponder is arranged on the person or object, wherein position data of the person or object can be determined by means of the radio location system, wherein the position data can be transmitted from the radio station of the radio location system to the control and evaluation unit and identification data can be determined from the marking on the person or on the object by means of the identification sensor, wherein the identification data can be transmitted from the identification sensor to the control and evaluation unit, and wherein the control and evaluation unit is configured to compare the position data of the radio location system and the identification data of the identification sensor and to form checked person or checked object data on a valid agreement.

The control and evaluation unit has inputs, a processing unit, and outputs. The identification sensor or the identification sensor and the radio stations is/are connected to the inputs. The control and evaluation unit can be a modular control and evaluation unit that is programmable via software.

The outputs of the control and evaluation unit can in particular be redundant safety outputs. They are here, for example, semiconductor-controlled switching outputs to safely shut down a drive of a machine, for example.

The invention is based on determining the person or the object unambiguously by two mutually independent features. These features are the identification that is determined by the sensor and the position that is determined by the radio location system. The position and an associated identification are thus determined by a redundant, in particular diverse, system.

The invention uses the combination of two diverse sensor technologies that mutually validate one another with respect to the position objective and the identification objective.

The first of the two sensor technologies is the radio location system or a radio based localization system by which the positions of radio transponders can be determined exactly to within a few centimeters. The radio location system also delivers classification information in addition to the position of the object or of the person with the aid of a radio transponder identification and a reference to an object or person stored thereon.

This system does not have to be developed and certified in the sense of functional safety, but can rather be co-used for a safety application as part of an anyway used automation or logistics functions.

The radio location is, here, for example, based on a triangulation of at least one radio transponder on the person or on the object. At least three radio stations that can detect the radio transponder are required for this purpose. The distance between the respective radio stations is known to the radio localization system here.

It is preferably a real time locating system (RTLS). The radio transponder or radio transponders is/are here arranged on the person or on the object. The radio stations receive the radio signals from the radio transponders and can thus determine their position and so the position the person or of the object.

In this respect, the position data are transmitted from the radio location system, namely the radio stations, to the control and evaluation unit.

The radio location system can also be radio frequencies of radio networks such as wireless LAN or WiFi. A 2.4 GHz or a 5 GHz band is, for example, used at a bandwidth of 20 MHz or 40 MHz.

The radio location system can also be radio frequencies of radio networks such as Bluetooth. Radio frequencies of 2.402 and 2.480 GHz are used here. The advantage of these frequencies is that they may be operated worldwide without a license. Ranges from 0 to 100 m can be reached depending on the power. The ranges and the associated maximum powers are divided into classes 1 to 3

The second system is the identification sensor. In this respect, a marking or optionally a transponder is required on the person or on the object. Identification information is thus directly accessible to the identification sensor. This identification sensor therefore delivers information on the person or on the object, for example whether the person is an authorized person who has specific access authorizations or with an object, whether it is a permitted or an unpermitted object or, for example, what kind of object it is and, for example, what dimensions the object has.

The two diverse part systems, namely the radio location system and the identification sensor, complement one another very well with respect to the functional tasks of position detection and identification and can therefore be reciprocally combined for validation and thus for a technical safety use.

A validation of an object identification or of a person identification and of an object position or person position could therefore schematically run as follows:

The radio location system determines the position of an object or of a person, with the object being located via the radio transponder. This information is transmitted to the control and evaluation unit.

The control and evaluation unit optionally transmits a search field, in which the radio location system has located the person or object, to the identification sensor.

The identification sensor checks whether a person or object of a suitable size and optionally of other validation parameters such as shape, etc. is detected in its detection zone or its search field. The identification sensor transmits the detected data to the control and evaluation unit.

The control and evaluation unit compares the detected features or the identification data of the person or object of the identification sensor with the detected features or the contour of the person or object of the radio location system.

In this respect, the detected position of the person or of the object of the radio location system and the detected identification data of the person or object of the identification sensor are compared with one another.

Both the person identification and the object identification can thus be reciprocally validated by the two diverse information channels and can thus be checked for a safety technical application.

In accordance with the invention, the marking contains the identification information for the person or object, whereby the person or object is unambiguously identifiable.

The invention enables a safe identification of persons or objects in a monitored zone and thus opens up the option of tailoring a safety function specifically to a respective situation. There is thus the possibility of satisfying a demand for risk reduction without impairing a productivity of an automation process.

An existing infrastructure can frequently be used. Radio location systems are used in an industrial environment, but also in the public area, e.g. in hospitals, for example to locate driverless transport vehicles.

An identification of persons or objects requires little calculation data in accordance with the invention. The sensor system is inexpensive and frequently even existing infrastructure can be used. In addition, the identification does not cause any disadvantageous latency times, which is a very big advantage for industrial safety engineering. The invention can also be advantageously used for human-robot collaboration in which persons have to act in direct proximity to the hazard site.

The physical principles of action and their strengths and weaknesses of the diverse sensors are advantageously complementary. Radio location systems, for example, have a natural immunity to extraneous light due to the principle of action. Radio location systems are furthermore not very sensitive to interfering objects such as dust, chips, or mist. In addition, it is possible by radio location systems to see through non-metallic walls so that a particularly early recognition of persons or objects is possible. This permits a high quality optimization of processes with a constant ensuring of occupational safety.

The object can be stationary or mobile articles. The object is, for example, transport material or processing material.

In a further development of the invention, the identification sensor and the radio stations are arranged as stationary or are arranged as mobile at a movable machine.

The movable machine or mobile machine can, for example be a guideless vehicle, a driverless vehicle, an automated guided vehicle (AGV), an autonomous mobile robot (AMR), an industrial mobile robot (IMR), or a robot having movable robot arms. The movable machine thus has a drive and can be moved in different directions.

The identification sensor is, for example, arranged at the front side of a vehicle to detect information from the environment. A plurality of identification sensors can also be arranged, in particular at the corners of the vehicle.

The control and evaluation unit is in this case likewise arranged at the movable machine and is connected to the identification sensor.

The outputs of the control and evaluation are connected to functional units such as the drive, the brakes, and/or the steering of the movable machine.

The stationary arrangement can be an arrangement at a machine, at a conveying path, at a passage, or similar.

In a further development of the invention, the radio location system is an ultra wideband radio location system, with the frequency used being in the range from 3.1 GHz to 10.6 GHz, with the transmission energy per radio station amounting to a maximum of 0.5 mW.

An absolute bandwidth in an ultra wideband radio location system amounts to at least 500 MHz or a relative bandwidth amounts to at least 20% of the central frequency.

The range of such a radio location system amounts, for example, to 0 to 50 m. In this respect, the short time duration of the radio pulses is used for the localization.

The radio location system thus only transmits radio waves having a low energy. The system can be used very flexibly and has no interference.

At a minimum only one single radio transponder has to be arranged on the person or object, said radio transponder being detected by at least three radio stations arranged as stationary, with the absolute positions and the spacing of the radio stations to one another being known.

A plurality of radio stations, for example more than three, are preferably arranged that monitor at least some of the movement zone of the person or of the object.

At least two or more radio transponders can also be arranged on the person or object. The position of the person or object can thereby be identified more exactly and the alignment of the person or object in the stationary state can also be detected when the arrangement of the radio transponders on the person or object is known.

In a further development of the invention, the identification sensor is an RFID sensor or an RFID reader or a barcode sensor.

If an RFID reader is used, an RFID transponder is arranged as a marking on the person or on the object.

The RFID reader has an antenna arrangement for communication with the RFID-transponder, with the transponder comprising at least one coil for interaction with the antenna arrangement of the RFID reader.

RFID (radio frequency identification) systems are used in transceiver systems for the automatic and contactless identification and/or localization of RFID transponders using radio waves. An RFID system typically first comprises the RFID transponder (also called a "tag") that comprises an antenna and that is located on the person or on the object. As a rule, it comprises a characterizing identification data code that can be queried via the antenna arrangement by the RFID reader of the RFID system (also called a "transceiver"). The RFID reader for this purpose comprises the antenna arrangement and a transceiver circuit (e.g. the EM4095 chip of EM Microelectronics) for reading this code from the RFID transponder. The RFID reader typically generates alternating magnetic fields to transmit signals to the RFID transponder to read the code from the RFID transponder. The RFID transponder is configured to send back a signal, in particular a signal comprising the code, as a response to the RFID reader after receipt of a corresponding signal from the RFID reader and the RFID reader evaluates and further processes it with the evaluation unit.

In RFID systems, the RFID reader generates alternating magnetic fields that are not only provided for transmitting the data, but that can also serve to supply the RFID transponders with energy.

An RFID system thus has the advantage that the RFID transponder does not require its own power supply and can therefore be used in a flexible manner. The RFID transponder draws its energy via radio waves from the RFID reader. The RFID transponder is addressed via the antenna arrangement of the RFID reader and responds to the RFID reader with a piece of information stored in the RFID transponder. The information transmitted by the transponder of the RFID system is received by the antenna arrangement and can subsequently be evaluated in the evaluation unit. The stored information on the transponder includes at least one code, namely the identification data that identify the RFID transponder.

Since the recognition of the RFID transponder takes place over radio waves, the system is very robust with respect to environmental influences. The RFID reading system can therefore be used with the RFID transponder in very rough environments, for example in industrial environments where lubricants are used an where, for example, a high degree of contamination can occur.

Since the recognition of the RFID transponder takes place over radio waves, a line of sight is not necessary between the RFID reader and the RFID transponder, unlike an optical solution. The RFID reader and the RFID transponder can therefore be completely encapsulated to protect them from harmful environmental influences.

If the identification sensor is configured as a barcode sensor, a barcode, a QR code, a data matrix code, or similar is affixed as a marking to the object or to the person.

The barcode sensor is configured to read the identification data of the object or of the person from the barcode and to communicate them to the control and evaluation unit.

In a further development of the invention, at least one encoder is additionally arranged on the object to verify the position of the person or of the object.

The encoder is connected to the control and evaluation unit and the control and evaluation unit is configured to evaluate the movement information of the encoders.

Movement information is thereby present to, for example, test the movement information of the radio transponders. A valid movement can thus be assumed when the encoder and the radio transponders have movement information with the same direction.

In a further development of the invention, spatially resolving sensors are arranged in addition to the radio location system to determine the position of the person or of the object.

The spatially resolving sensor checks whether a person or object of a suitable size and optionally of other validation parameters such as shape, speed, etc. is detected in its detection zone or its search field. The spatially resolving sensor transmits the detected data to the control and evaluation unit.

The control and evaluation unit compares the detected features or contour of the person or object of the spatially resolving sensor with the detected features or contour of the person or object of the radio location system.

In addition, the detected position of the person or of the object of the radio location system and the detected position of the person or object of the spatially resolving sensor are compared with one another. The person position or object position can thus be reciprocally validated by the two diverse information channels and can thus be checked for a safety technical application.

In a further development of the invention, the spatially resolving sensor is a laser scanner.

Laser scanners transmit a light beam at a variable spatial angle, with the distance of the object being determined on the basis of the remitted light, for example on the basis of the time of flight or a phase measurement. The light beam is, for example, transmitted by a rotating mirror in a rotary manner into a monitored zone, whereby a protected field and/or a warning field is formed. Laser scanners can detect objects and persons in a safety directed manner.

In a further development of the invention, at least one spatially limited access zone having at least one access station for a facility is arranged, wherein the facility has at least one safety zone and at least one hazardous zone within the safety zone, with the safety zone only being accessible via the access zone so that the access zone can be passed through by the person or by the object before reaching the safety zone and after leaving the safety zone, with the access zone only being able to be passed through with checked person data or checked object data.

It is possible that a person can dwell in the hazard zone since the hazardous or dangerous movement in this zone has transformed into a safe state, for example has stopped or has a low movement speed. However, production with a productive operation of a machine can continue, for example, in an adjacent hazardous zone since no person is present there.

The safety system is a safety system in accordance with the safety of machinery, for, example in accordance with the standard EN/ISO 13849-1 or with the standard EN/IEC 62061 that, for example, provides the framework for functional safety of safety-related electrical control systems and their subsystems at machines.

The access zone is a spatially limited access zone having an access station, for example a gate or a door. The safety zone of the facility is only accessible through this access zone. A plurality of access zones can also be arranged. This can in particular be sensible with very large facilities that have a plurality of safety zones, for example.

The access station can, for example, have electronic means such as an electronic door switch, whereby a check can be made whether the access zone has been opened.

The facility can, for example, be an industrial facility for manufacturing products. It is, for example, in this respect a part of a production plant for automobiles. The facility can also be a part of a machine or a facility having a plurality of machines. The facility has a safety zone that may not be entered by persons when the facility is active since the person may be in danger from parts of the facility. The facility is, for example, one or more robots whose dangerous action zone is disposed within the safety zone.

In a further development of the invention, the access station of the access zone can be locked and can only be passed through by authorized persons with checked person data or by authorized objects with checked object data.

Unauthorized access is thereby prevented and only an authorized person who namely bears the marking can enter the safety zone.

The safety for persons is thereby increased since the safety zone can no longer be entered unintentionally. The availability of the facility is thereby increased. For example, an electronic guard lock can be located as a lock at the access station that automatically releases the access zone if the person carries the key unit.

In a further development of the invention, a dangerous movement of a machine in at least one hazardous zone is transformed into a safe state when the person or the object approaches the hazardous zone or the person or the object are present in the hazardous zone. The remaining parts of the facility can thereby continue to be productively operated.

In a further development of the invention, a warning zone is formed adjacent to the hazardous zone, with a dangerous movement of a machine in at least one hazardous zone being transformed into a safe state when the person or the object is present in the warning zone.

The warning zone has the result that persons may move in the safety zone outside the warning zone and outside the hazardous zone. However, as soon as a person is present in the warning zone, the movement in the hazardous zone is transformed into the safe state. The warning zone thus forms a defined fixed zone to initiate a safe state in the hazardous zone. Depending on the trailing time of the machine, the warning zone can be dimensioned as larger or smaller. The hazardous zone is here only accessible via the warning zone.

In a further development of the invention, at least that part of the facility is in a safe state in whose zone the person or the object is detected. The remaining parts of the system can thereby continue to be productively operated.

Figure 2:
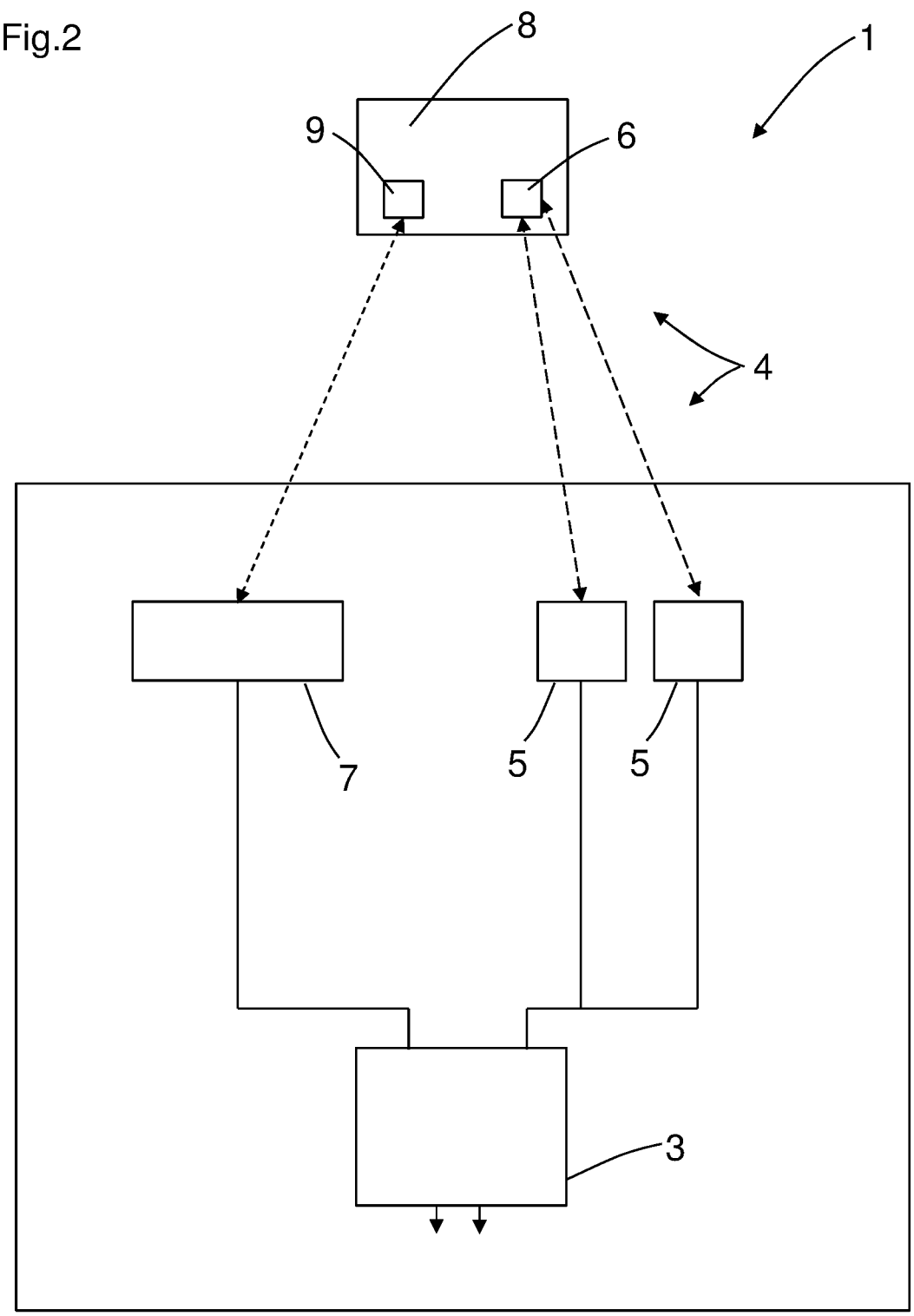
Figure 3:
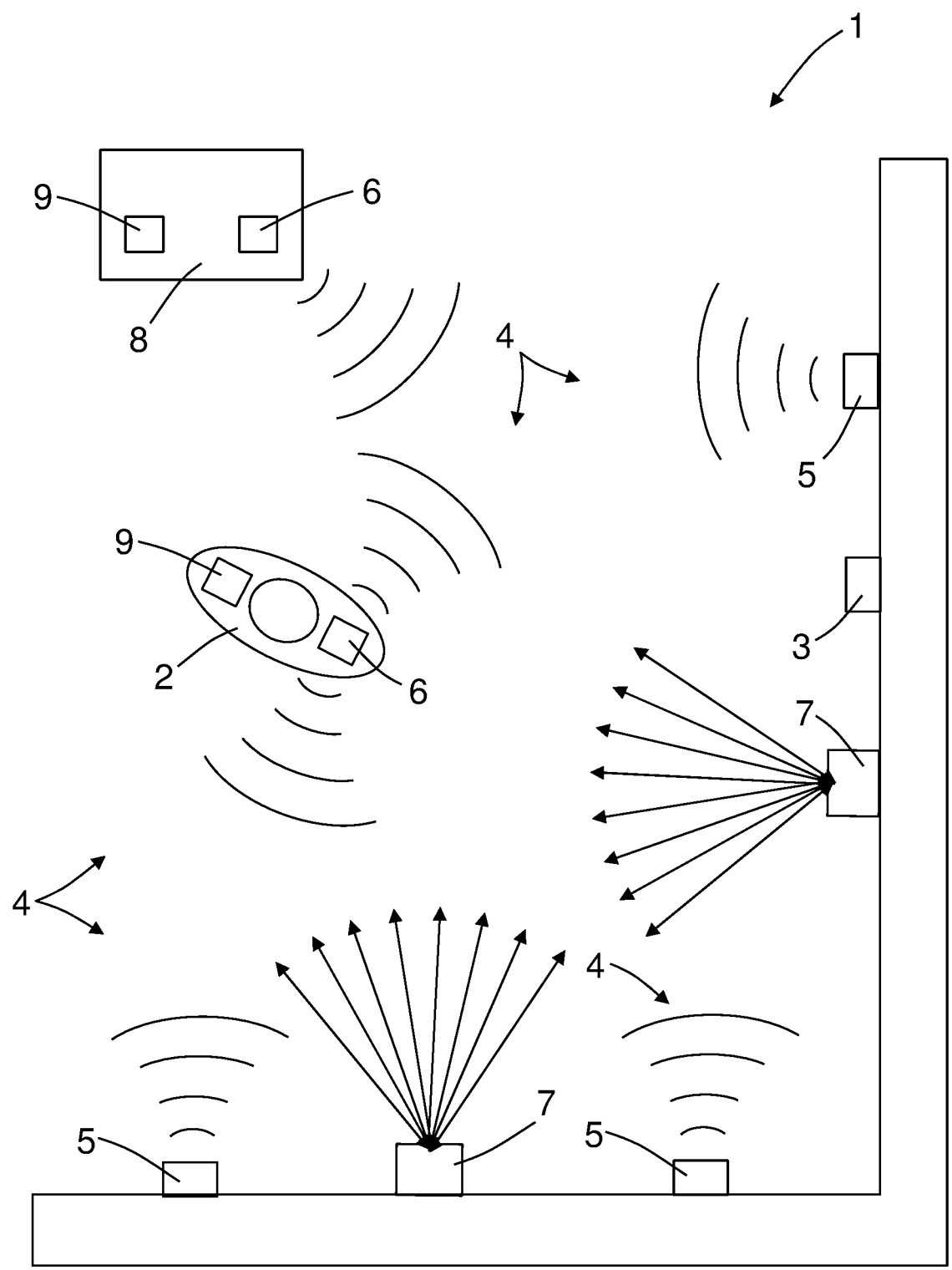
Figure 4:
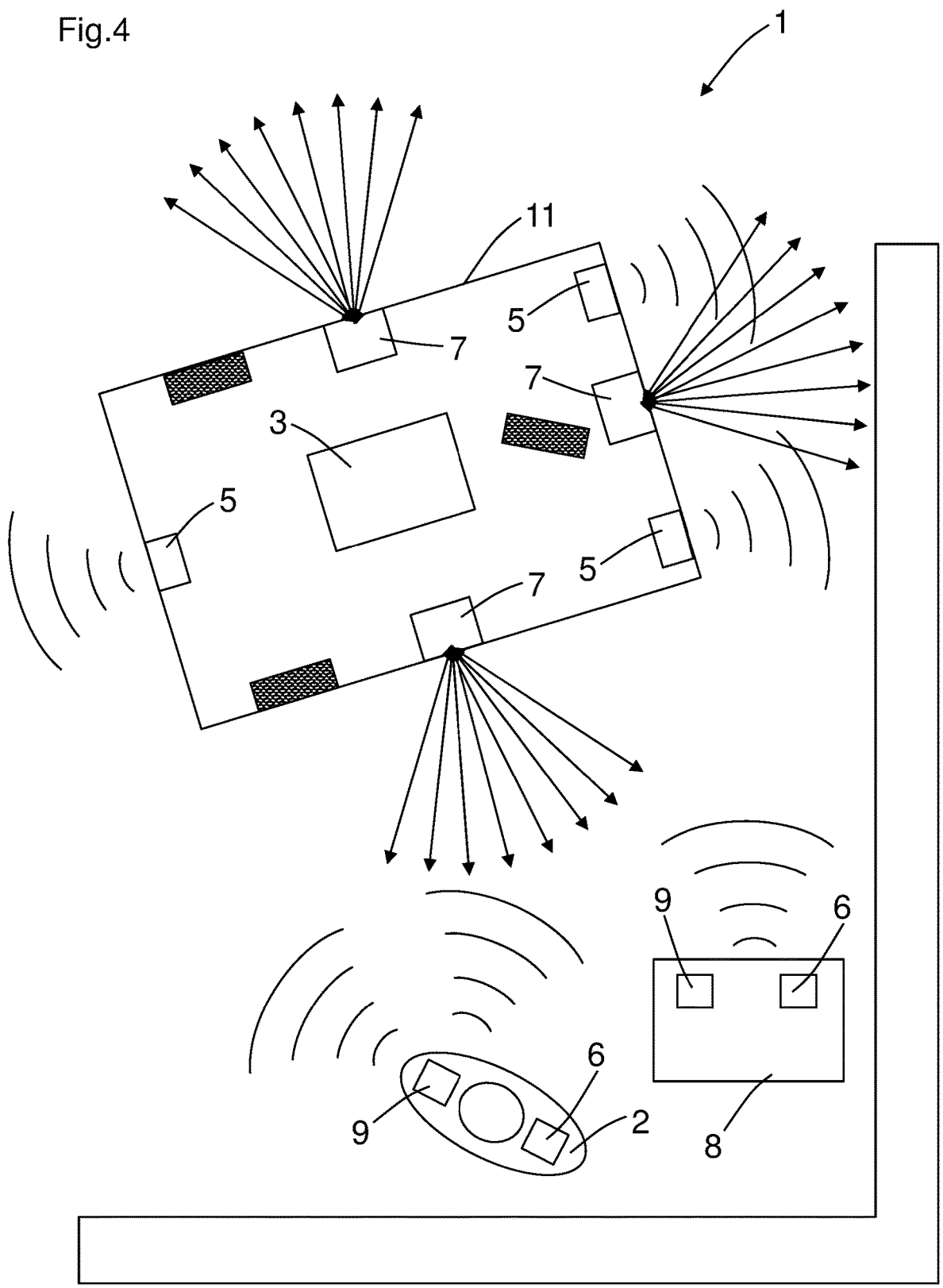
Figure 5:
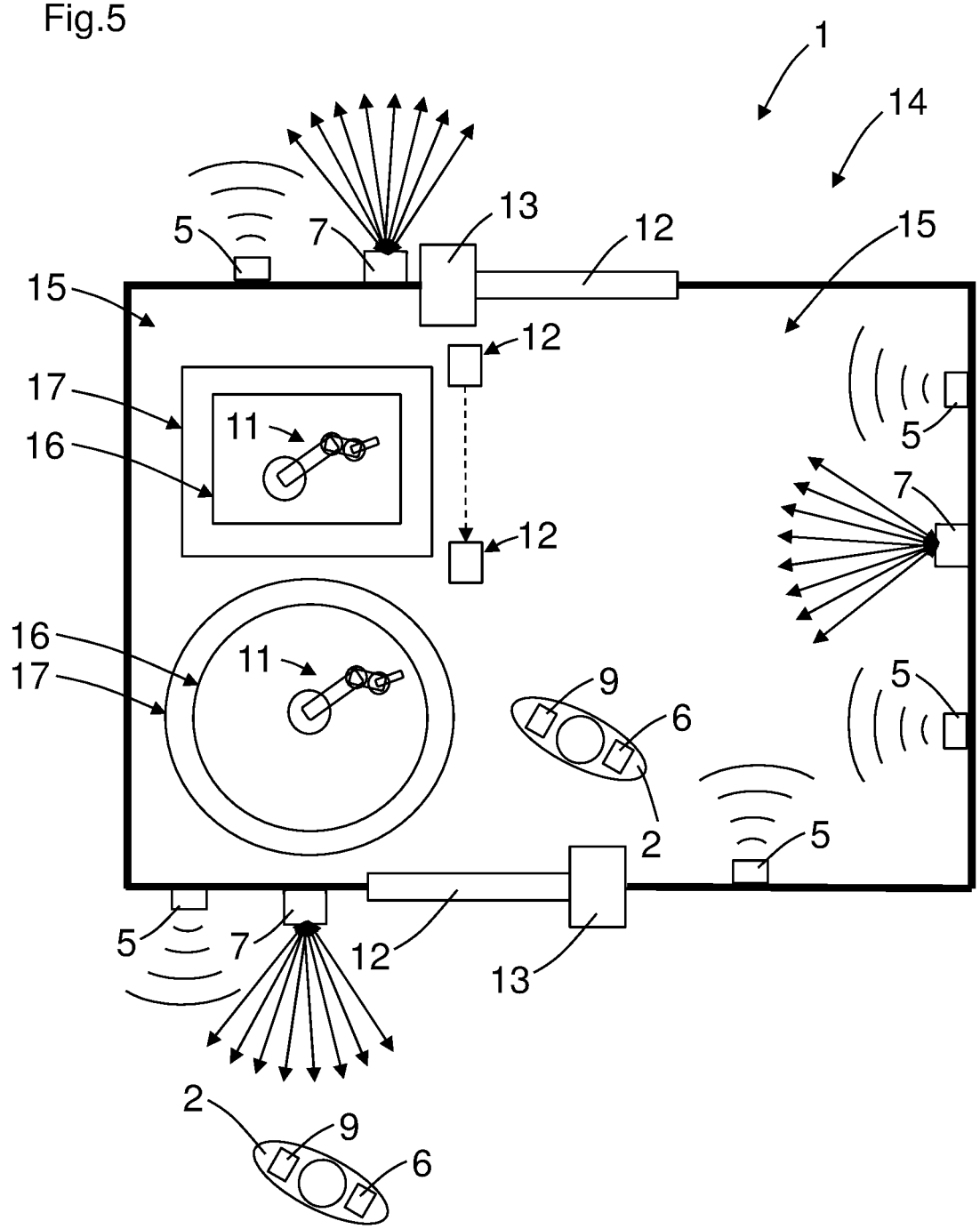

The invention will also be explained in the following with respect to further advantages and features with reference to the enclosed drawing and to embodiments. The Figures of the drawing show in:

FIG. 1 a safety system 1 for localizing and identifying a person;

FIG. 2 a safety system 1 for localizing and identifying an object;

FIG. 3 a safety system 1 for localizing and identifying a person or an object with radio stations arranged as stationary;

FIG. 4 a safety system 1 for localizing and identifying a person or an object with radio stations arranged as mobile; and FIG. 5 a spatially limited access zone with at least one access station for a system.

In the following Figures, identical parts are provided with identical reference numerals.

FIG. 1 shows a safety system 1 for localizing and identifying a person 2 having a control and evaluation unit 3, having at least one radio location system 4, having at least one identification sensor 7 for identifying the person 2, wherein a marking 9 is arranged on the person, wherein the radio location system 4 has arranged radio stations 5, wherein at least one radio transponder 6 is arranged on the person 2, wherein position data of the person 2 can be determined by means of the radio location system 4, wherein the position data can be transmitted from the radio station 5 of the radio location system 4 to the control and evaluation unit and identification data of the marking 9 on the person 2 can be determined by means of the identification sensor 7, wherein the identification data can be transmitted from the identification sensor 7 to the control and evaluation unit 3, and wherein the control and evaluation unit 3 is configured to compare the position data of the radio location system 4 and the identification data of the identification sensor 7 and for form checked person data on a valid agreement.

Analog to FIG. 1, FIG. 2 shows a safety system 1 for localizing and identifying an object; 8 having a control and evaluation unit 3, having at least one radio location system 4, and having at least one identification sensor 7 for identifying the object 8.

The control and evaluation unit 3 has inputs, a processing unit, and outputs. The identification sensor 7 and the radio stations 5 are connected to the inputs. The control and evaluation unit 3 can be a modular control and evaluation unit that is programmable via software.

The outputs of the safety control and evaluation unit 3 can in particular be redundant safety outputs. They are here, for example, semiconductor-controlled switching outputs to safely shut down the drive of a machine, for example.

The first of the two sensor technologies is the radio location system 4 or a radio based localization system by which the positions of radio transponders 6 can be determined exactly to within a few centimeters. The radio location system 4 optionally delivers classification information or identification information in addition to the position of the object 8 or of the person 2 with the aid of a radio transponder identification and a reference to an object 8 or person 2 stored thereon.

The second system is the identification sensor 7. In this respect, a marking 9 or optionally a transponder is required on the person 2 or on the object 8. Identification information is thus directly accessible to the identification sensor 7. This identification sensor 7 therefore delivers information on the person 2 or on the object 8, for example whether the person 2 is an authorized person 2 who has specific access authorizations or with an object 8, whether it is a permitted or an unpermitted object 8 or, for example, what kind of object 8 it is and, for example, what dimensions the object 8 has.

A validation of an object identification or of a person identification and of an object position or person position could run as follows in accordance with FIG. 3:

The radio location system 4 determines the position of an object 8 or of a person 2, with the object 8 or the person being located via the radio transponder 6 This information is transmitted to the control and evaluation unit 3.

The control and evaluation unit 3 optionally transmits a search field, in which the radio location system 4 has identified the person 2 or object 8, to the identification sensor 7.

The identification sensor 7 checks whether a person 2 or an object 8 of a suitable size and optionally of other validation parameters such as shape, etc. is detected in its detection zone or its search field. The identification sensor 7 transmits the detected data to the control and evaluation unit 3.

The control and evaluation unit 3 compares the detected features or the identification data of the person 2 or object 8 of the identification sensor 7 with the detected features or with the contour of the person 2 or of the object 8 of the radio location system 4.

In this respect, the detected position of the person 2 or of the object 8 of the radio location system 4 and the detected identification data of the person 2 or of the object 8 of the identification sensor 7 are compared with one another.

Both the person identification and the object identification can thus be reciprocally validated by the two diverse information channels and can thus be checked for a safety technical application.

In accordance with the FIG. 3 the marking 9 contains the identification information for the person 2 or for the object 8, whereby the person 2 or the object 8 is unambiguously identifiable.

In accordance with FIG. 3, the identification sensor 7 and the radio stations 5 are arranged as stationary.

In accordance with FIG. 4, the identification sensor 7 and the radio stations 5 are arranged as mobile at a movable machine 11.

The movable machine 11 or mobile machine can, for example, be a guideless vehicle or, in accordance with FIG. 5, a robot having movable robot arms. The movable machine 11 thus has a drive and can be moved in different directions.

Optionally, the radio location system 4 is an ultra wideband radio location system, with the frequency used being in the range from 3.1 GHz to 10.6 GHz, with the transmission energy amounting to a maximum of 0.5 mW per radio station.

At a minimum only one single radio transponder 6 has to be arranged at the person 2 or object 8, said radio transponder 6 being detected by at least three radio stations 5 arranged as stationary, with the spacing of the radio stations 5 being known.

A plurality of radio stations 5, for example more than three, are preferably arranged that monitor at least a part of the movement zone of the person 2 or object 8.

At least two or more radio transponders 6 can also be arranged at the person 2 or object 8. The position of the person 2 or object 8 can thereby be identified more exactly and the alignment of the person 2 or object 8 in the stationary state can also be detected when the arrangement of the radio transponders 6 on the person 2 or object 8 is known.

Optionally the identification sensor 7 is an RFID sensor or an RFID reader or a barcode sensor.

If an RFID reader is used an RFID transponder is arranged as a marking 9 on the person 2 or on the object 8.

If the identification sensor 7 is configured as a barcode sensor, a barcode, a QR code, a data matrix code, or similar is affixed as a marking 9 to the object 8 or to the person 2.

The barcode sensor is configured to read the identification data of the object 8 or of the person 2 from the barcode and to communicate it to the control and evaluation unit 3.

Optionally, at least one encoder is additionally arranged on the person 2 or on the object 8 to verify the position of the person 2 or of the object 8.

The encoder is connected to the control and evaluation unit 3 and the control and evaluation unit 3 is configured to evaluate the movement information of the encoders.

In accordance with FIGS. 3 and 4, spatially resolving sensors can be arranged in addition to the radio location system 4 to determine the position of the person or of the object.

The spatially resolving sensor checks whether a person 2 or object 8 of a suitable size and optionally of other validation parameters such as shape, speed, etc. is detected in its detection zone or its search field. The spatially resolving sensor transmits the detected data to the control and evaluation unit 3.

The control and evaluation unit 3 compares the detected features or the contour of the person 2 or object of 8 the spatially resolving sensor with the detected features or the contour of the person 2 or object 8 of the radio location system 4. Optionally, the spatially resolving sensor is a laser scanner.

In accordance with FIG. 5, at least one spatially limited access zone 12 having at least one access station 13 for a facility 14 is arranged, wherein the facility 14 has at least one safety zone 15 and at least one hazardous zone 16 within the safety zone 15, with the safety zone 15 only being accessible via the access zone 12 so that the access zone 12 can be passed through by the person 2 or by the object 8 before reaching the safety zone 15 and after leaving the safety zone 15, with the access zone 12 only being able to be passed through with checked person data or checked object data.

It is possible that a person 2 can dwell in the hazardous zone 16 since the hazardous or dangerous movement in this zone has transformed into a safe state, for example has stopped or has a safe low movement speed. However, production with a productive operation of a machine can continue, for example, in an adjacent hazardous zone 16 since no person is present there.

The access zone 12 is a spatially bounded access zone 12 having an access station 13, for example a gate or a door. The safety zone 15 of the facility 14 is only accessible through this access zone 12. A plurality of access zones 12 can also be arranged. This can in particular be sensible with very large facilities that have a plurality of safety zones 15, for example.

The access station 13 can, for example, have electronic means such as an electronic door switch, whereby a check can be made whether the access zone 12 has been opened.

The facility 14 can, for example, be an industrial facility for manufacturing products. It is, for example, in this respect a part of a production plant for automobiles. The facility 14 can also be a part of a machine or a facility 14 having a plurality of machines. The facility 14 has a safety zone 15 that may not be entered by persons 2 when the facility 14 is active since the person 2 may be in danger from parts of the facility 14. The facility 14 is, for example, one or more robots whose dangerous action zone is disposed within the safety zone 15.

Optionally, the access station 13 of the access zone 12 can be blocked and can only be passed through by authorized persons 2 with checked person data or by authorized objects 8 with checked object data.

Unauthorized access is thereby prevented and only an authorized person 2 who bears the marking 9 can enter into the safety zone 15.

Optionally, a warning zone 17 is formed adjacent to the hazardous zone 16, with a dangerous movement of a machine in at least one hazardous zone 16 being transformed into a safe state when the person 2 or the object 8 is present in the warning zone 17.

The warning zone 17 has the result that persons 2 may move in the safety zone 16 outside the warning zone 17 and outside the hazardous zone 16. However, as soon as a person 2 is present in the warning zone 17, the movement in the hazardous zone 16 is transformed into the safe state. The warning zone 17 forms a defined fixed zone to initiate a safe state in the hazardous zone 16. Depending on the trailing time of the machine, the warning zone 17 can be dimensioned as larger or smaller. The hazardous zone 16 is here only accessible via the warning zone 17.

Optionally, at least some of the system is in a safe state in whose zone the person 2 or the object 8 is detected. The remaining parts of the facility 14 can thereby continue to be productively operated.

REFERENCE NUMERALS 1 safety system
2 person
3 control and evaluation unit
4 radio location system
5 radio stations
6 radio transponder
7 identification sensor
8 object
9 marking
11 movable machine
12 access zone
13 access station
14 facility
15 safety zone
16 hazardous zone
17 warning zone

The invention claimed is:

1. A safety system for localizing and identifying a person or object, the safety system comprising:
   a control and evaluation unit;
   at least one radio location system; and
   at least one identification sensor for identifying the person or the object, wherein a marking is arranged on the person or on the object,
   wherein the at least one radio location system has arranged radio stations,
   wherein the at least one radio location system comprises at least one ultra-wideband radio location system operating on a frequency in the range between 3.1 GHz and 10.6 GHz, and with a transmission energy per radio station having a maximum of 0.5 mW,
   wherein at least one radio transponder is arranged on one of the person and the object, the at least one radio transponder being arranged separately on the one of the person and the object from the marking,
   wherein position data of the one of the person and the object can be determined from the at least one radio transponder arranged thereon by means of the at least one radio location system,
   wherein the position data can be transmitted from the arranged radio stations of the at least one radio location system to the control and evaluation unit,
   wherein identification data can be determined from the marking arranged on the one of the person or on the object by means of the at least one identification sensor,
   wherein the identification data can be transmitted from the at least one identification sensor to the control and evaluation unit, and
   wherein the control and evaluation unit is configured to compare the position data of the at least one radio location system and the identification data of the at least one identification sensor and to form checked person data or checked object data on a valid agreement.

2. The safety system in accordance with claim 1, wherein the at least one identification sensor and the arranged radio stations are arranged as stationary or are arranged as mobile at a movable machine.

3. The safety system in accordance with claim 1, wherein the at least one identification sensor is an RFID sensor or a barcode sensor.

4. The safety system in accordance with claim 1, wherein at least one encoder is additionally arranged to verify the position of the object.

5. The safety system in accordance with claim 1, wherein at least one spatially resolving sensor is arranged in addition to the at least one radio location system to determine the position of the person or of the object.

6. The safety system in accordance with claim 5, wherein the at least one spatially resolving sensor is a laser scanner.

7. The safety system in accordance with claim 1, wherein at least one spatially limited access zone having at least one access station for a facility is arranged,
   wherein the facility has at least one safety zone and at least one hazardous zone within the safety zone,
   wherein the at least one safety zone is only accessible via the at least one spatially limited access zone so that the at least one spatially limited access zone can be passed through by the person or by the object before reaching the at least one safety zone and after leaving the at least one safety zone, and
   wherein the at least one spatially limited access zone is only able to be passed through with the checked person data or the checked object data.

8. The safety system in accordance with claim 7, wherein the at least one access station of the at least one spatially limited access zone can be locked and can only be passed through by permitted persons or permitted objects.

9. The safety system in accordance with claim 1, wherein a dangerous movement of a movable machine in at least one hazardous zone is transformed into a safe state when the person or the object approaches the hazardous zone or the person or the object is present in the hazardous zone.

10. The safety system in accordance with claim 9, wherein a warning zone is formed adjacent to the at least one hazardous zone, with the dangerous movement of the movable machine in the at least one hazardous zone being transformed into the safe state when the person or the object is present in the warning zone.

11. The safety system in accordance with claim 1, wherein at least that part of a facility is in a safe state in whose region the person or the object is detected.

12. The safety system in accordance with claim 1, wherein the at least one identification sensor and the arranged radio stations are each mounted on a movable machine.

13. A method for localizing and identifying a person or object using a safety system, the safety system having a control and evaluation unit, at least one radio location system, and at least one identification sensor for identifying the person or the object, wherein a marking is arranged on one of the person and the object, wherein the at least one radio location system has arranged radio stations, wherein the at least one radio location system comprises at least one ultra-wideband radio location system operating on a frequency in the range between 3.1 GHz and 10.6 GHz and with a transmission energy per radio station having a maximum of 0.5 mW, and at least one radio transponder is arranged on the one of the person and the object, the at least one radio transponder being arranged separately on the one of the person and the object from the marking, the method comprising:

determining position data of the one of the person and the object from the at least one radio transponder arranged thereon by means of the at least one radio location system;

transmitting the position data from the arranged radio stations of the at least one radio location system to the control and evaluation unit;

determining identification data from the marking on the one of the person and the object by means of the at least one identification sensor;

transmitting the identification data from the at least one identification sensor to the control and evaluation unit; and comparing the position data of the at least one radio location system and the identification data of the at least one identification sensor using the control and evaluation unit and forming checked person data or checked object data on a valid agreement.

14. The method in accordance with claim 13, further comprising the step of mounting the at least one identification sensor and the arranged radio stations on a movable machine.

\* \* \* \* \*